(No Model.)

A. J. MOXHAM.
METHOD OF WELDING METAL.

No. 496,890. Patented May 9, 1893.

WITNESSES:
Hamilton E. Ford
Harry W. Smith

INVENTOR
Arthur J. Moxham
BY
E. W. Cady
ATTORNEY.

UNITED STATES PATENT OFFICE.

ARTHUR J. MOXHAM, OF JOHNSTOWN, PENNSYLVANIA.

METHOD OF WELDING METAL.

SPECIFICATION forming part of Letters Patent No. 496,890, dated May 9, 1893.

Application filed June 27, 1892. Serial No. 438,198. (No model.)

*To all whom it may concern:*

Be it known that I, ARTHUR J. MOXHAM, a resident of Johnstown, Pennsylvania, have invented a new and useful Method of Welding Two Pieces of Metal Together, of which the following is a specification.

The object of this invention is to provide an improved method of electrically welding together two pieces of metal which have considerable extent of welding surface, by preventing the dissipation of heat during the welding.

My improved method, in general terms, to be hereinafter more specifically described consists in initially making the metallic contact between advance portions of the two pieces of metal, in one or both of which the path of heat conduction is cut away, and the heat so localized.

I will describe my invention as applied to welding together girder rails, but my invention is not limited to any particular form of rail nor of any particular form of metallic pieces to be welded.

Figure 1:
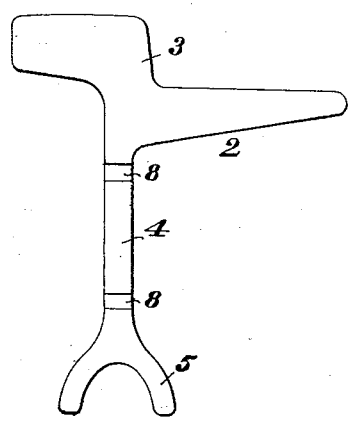
Figure 2:
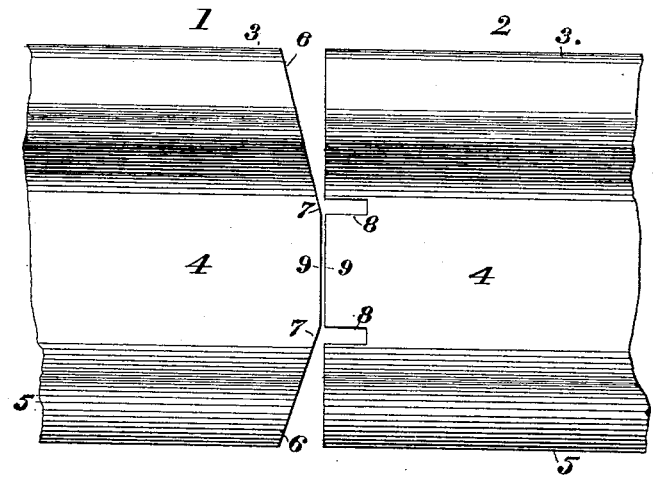
Figure 3:
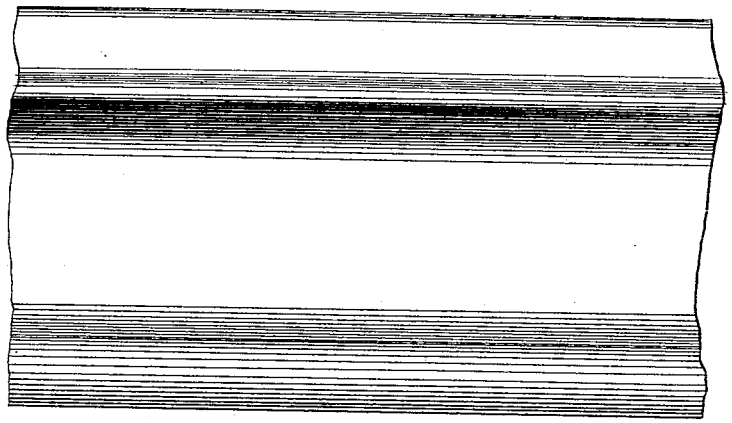

In the accompanying drawings: Figure 1 is an end view of a rail having its web provided with slots or recesses. Fig. 2 is a side view of the abutting ends of two rails, showing the end of the web of one provided with recesses, and the top and bottom portions of the web of the other cut away at its end. Fig. 3 is a side view of a portion of a rail formed from the two abutting ends of rails shown in Fig. 2, after welding.

1 and 2 indicate the abutting ends of two rails which may be of any desired shape, and as here shown are each formed with a head 3, web 4, and channeled bottom 5. The abutting end of a rail is cut away at its top and bottom as shown at 6, together with portions of the web as shown at 7, and at the end of rail 2, its web is recessed at the points 8 at the top and bottom of the web. By means of this construction the contact points of the abutting ends of rails 1 and 2, are limited to portions of their webs as shown at points 9, bringing these portions of the webs into contact for welding in advance of the remaining portions of the ends of the rails, including their heads and feet. In addition to providing contact points in advance of the remaining portions of the ends of the rails, it is advisable to prevent the heat, at the point of welding induced by the current, from becoming dissipated at that point by being conducted away in the adjacent metallic surface directly to the head and foot of the rail. This is prevented by nipping or cutting away the web, as in the example shown by the recesses 8.

The process of welding the rails is as follows: The rails 1 and 2 having been placed in position as shown in Fig. 2, an electric current is passed through the rails by electric contact of transformers applied to the heads and feet respectively of the rails. As the tendency of the current is to the shortest path, were it not that the heads and feet respectively of the rails are separated by the cut away portions 6 of rail 1, short circuits would be established through the heads and feet of the rails, those points being the shortest paths of the electric circuit and the heads and feet would become welded, the webs of the rails remaining unwelded. By means of the separation of the heads and feet of rails 1 and 2, however, through the cut away portions 6 of rail 1, the current is induced to flow through the webs of rails 1 and 2 to and through the contact portions 9. By means of the recesses 8 in rail 2, and the portions of the rail 1 cut away at 7, the area of the contact surface is reduced thereby facilitating and expediting the welding, and furthermore the web of rail 2 being cut away adjacent to its head and foot, the paths for conducting away the heat induced by the current, directly from the point of welding to the head and foot of rail 2 are interrupted and the welding heat is localized at the exposed portion 9 between the recesses 8. When a welding heat has been reached at the point of contact of the portions 9 of rails 1 and 2, the two rails are forced toward each other, until by the upsetting of the contact and the adjacent sections of the webs, the opposing heads and feet of the rails are brought into contact. The electric current will then pass from head to head and from foot to foot, this now being the shorter circuit, as these members become heated to the welding degree, and in so doing the previously welded sections are still further compressed, or upset. While the recesses 8 are shown, other shapes of recess may be employed for the purpose heretofore stated, and if desired the webs of the abutting ends of both rails may be recessed for the same purpose, although the inclining backward of the one rail tends in a lesser degree, to the localizing of the heat at the desired point.

In arranging the contacts regard is had to the proportion and section area of the different parts of the mass operated on, as this will influence the result. In this method, the area of contact surface is reduced, and the welding heat is localized at the point of welding.

I claim—

1. The hereinbefore described method of electrically welding two pieces of metal together, which consists in forming the adjacent ends of the pieces of metal with advance contact portions, one or both of said advance contact portions being separated from the adjacent metallic portion of the piece by recesses, passing an electric current through the advance contact portions and exerting pressure on said pieces.

2. The hereinbefore described method of electrically welding rails together, which consists in forming any rail with a portion of its web projecting beyond the head and feet at the welding end of the rail, forming the other rail with recesses in its adjacent end near its top and bottom, passing an electric current through the heads and feet of said rails and exerting pressure upon said rails.

In testimony whereof I have affixed my signature in presence of two witnesses.

ARTHUR J. MOXHAM.

Witnesses:
 A. J. BRYAN,
 D. BRYAN.